US008769130B1

(12) United States Patent
Chang et al.

(10) Patent No.: US 8,769,130 B1
(45) Date of Patent: Jul. 1, 2014

(54) SELECTION OF COMPUTER NETWORK WIRELESS ACCESS POINTS

(75) Inventors: Chia-Chi Chang, Taipei (TW); Kun-Shan Lin, Taipei (TW); Pei-Chun Yao, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 159 days.

(21) Appl. No.: 12/119,299

(22) Filed: May 12, 2008

(51) Int. Cl.
G06F 15/16 (2006.01)
H04L 12/66 (2006.01)
H04L 12/28 (2006.01)
H04L 12/56 (2006.01)

(52) U.S. Cl.
USPC ............................. 709/229; 370/352; 370/401

(58) Field of Classification Search
USPC .......................................................... 709/229
See application file for complete search history.

(56) References Cited

U.S. PATENT DOCUMENTS

| 2004/0156372 | A1* | 8/2004 | Hussa ............................ 370/401 |
| 2006/0253458 | A1 | 11/2006 | Dixon et al. |
| 2006/0253578 | A1 | 11/2006 | Dixon et al. |
| 2006/0253579 | A1 | 11/2006 | Dixon et al. |
| 2006/0253580 | A1 | 11/2006 | Dixon et al. |
| 2006/0253581 | A1 | 11/2006 | Dixon et al. |
| 2006/0253582 | A1 | 11/2006 | Dixon et al. |
| 2006/0253583 | A1 | 11/2006 | Dixon et al. |
| 2006/0253584 | A1 | 11/2006 | Dixon et al. |
| 2007/0142030 | A1* | 6/2007 | Sinha et al. .................. 455/410 |

OTHER PUBLICATIONS

DHCP—Knowledge Base, University Information Technology Services, Indiana University, Sep. 11, 2007, 1 sheet [retrieved on Nov. 5, 2007] [retrieved from the internet: <URL:http://kb.iu.edu/data/adov.html].
IEEE 802.11—Wikipedia, the free encyclopedia, 9 sheets [retrieved on Nov. 5, 2007] [retrieved from the internet: <URL: http://en.wikipedia.org/wiki/IEEE_802.11.
Wireless access poin—Wikipedia, the free encyclopedia, 3 sheets [retrieved on Nov. 5, 2007] [retrieved from the internet: <URL:http://en.wikipedia.org/wiki/Wireless_access_point.
Intelligraphics—Introduction to IEEE 802.11, 1997, 6 sheets [retrieved on Nov. 6, 2007] [retrieved from the internet: <URL:http://www.intelligraphics.com/articles/80211_article.html.
Packet (information technology)—Wikipedia, the free encyclopedia, 5 sheets [retrieved on Nov. 7, 2007] [retrieved from the internet: <URL:http://en.wikipedia.org/wiki/Data_packet.

\* cited by examiner

Primary Examiner — Noel Beharry
Assistant Examiner — Farhad Ali
(74) Attorney, Agent, or Firm — Okamoto & Benedicto LLP

(57) ABSTRACT

Client computers may be configured to communicate with a security server computer to receive access point information for computer network wireless access points in a particular geographic location. A client computer may provide its current geographic location to the security server computer to request access point information. The server computer may retrieve from an access point database access point information for computer network wireless access points in the geographic location. The server computer may provide the access point information to the client computer, which may display the access point information over a geographic map. The access point information may indicate whether any computer network wireless access point in the geographic location poses a computer security threat.

11 Claims, 4 Drawing Sheets

SELECTION OF COMPUTER NETWORK WIRELESS ACCESS POINTS

BACKGROUND OF THE INVENTION

1. Field of the Invention

The present invention relates generally to computer security, and more particularly but not exclusively to methods and apparatus for selecting computer network wireless access points.

2. Description of the Background Art

Wireless technology allows computers to wirelessly communicate over a computer network that is equipped with a wireless access point. Generally speaking, a wireless access point is a device or node that allows computers to wirelessly connect to the computer network. Wireless access points are available in various geographic locations, including public and private hot spots and even some residential neighborhoods. Wireless access points conveniently allow portable computing devices to connect to a computer network and access the Internet, for example. Connecting to a wireless access point, however, is not without its share of problems. Some wireless access points may be setup or hijacked for phishing, man-in-the-middle attacks, distribution of viruses, and other malicious purposes.

SUMMARY

Client computers may be configured to communicate with a security server computer to receive access point information for computer network wireless access points in a particular geographic location. A client computer may provide its current geographic location to the security server computer to request access point information. The server computer may retrieve from an access point database access point information for computer network wireless access points in the geographic location. The server computer may provide the access point information to the client computer, which may display the access point information over a geographic map. The access point information may indicate whether any computer network wireless access point in the geographic location poses a computer security threat.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Computer viruses, worms, Trojans, rootkits, and spyware are examples of malicious codes that have plagued computer systems throughout the world. Although there are technical differences between each type of malicious code, malicious codes are collectively referred to herein as "viruses." For example, commercially available "antivirus software" is designed to scan a computer for viruses as well as worms and other malicious codes.

Figure 1:
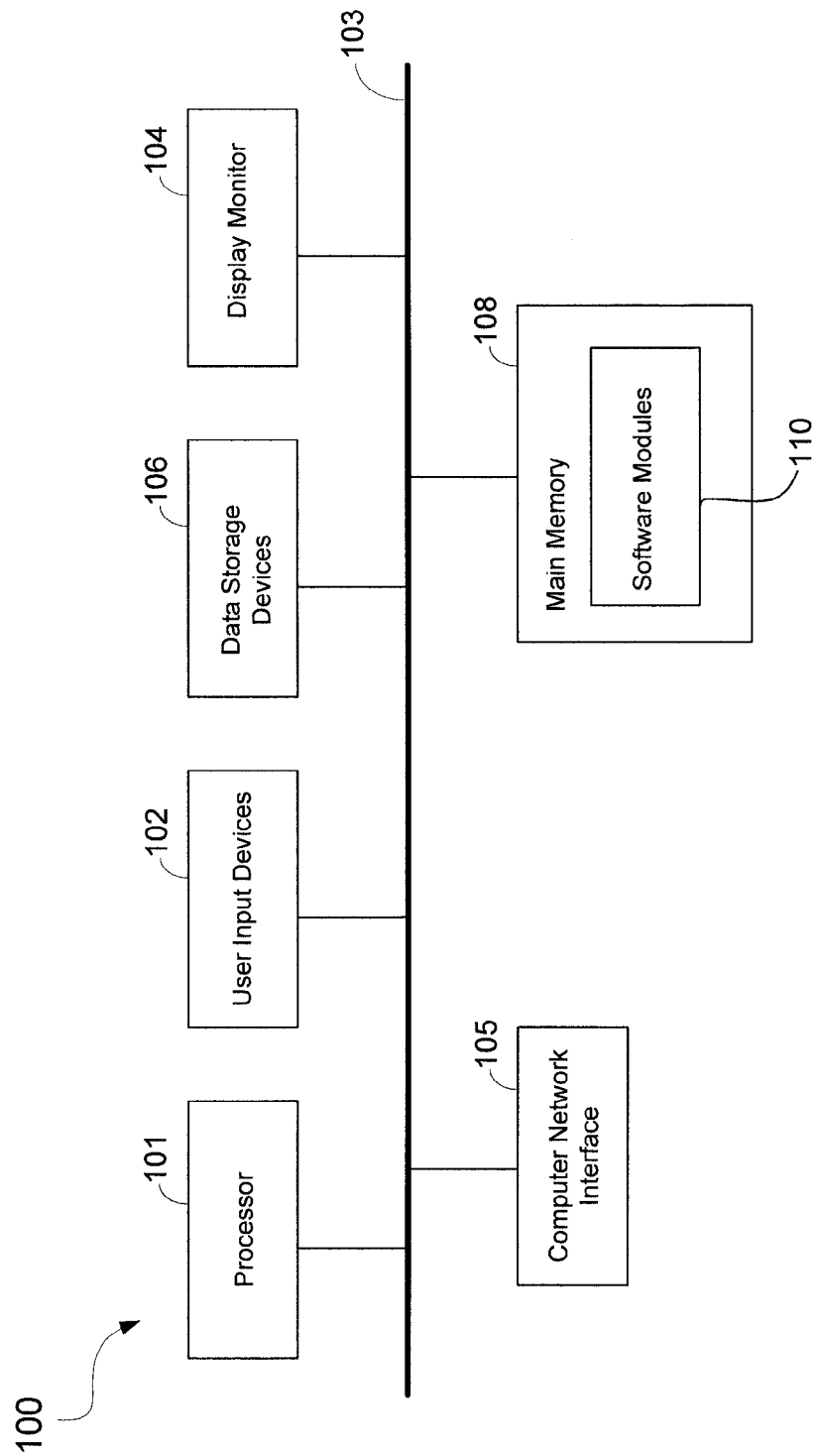
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a server computer (e.g., server computer 450 of FIG. 4) or a client computer (e.g., client computers 430 and 440 of FIG. 4) depending on its configuration. The computer 100 may have fewer or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105, and a main memory 108 (e.g., RAM). The computer network interface 105 may comprise a wireless network adapter when the computer 100 is being used as a client or a wired network adapter when the computer 100 is being used as a server, for example. The computer network interface 105 may be configured to allow the computer 100 to communicate over the Internet.

In the example of FIG. 1, the main memory 108 includes software modules 110, which may be computer-readable program code running in a server computer or a client computer. The software modules 110 may be loaded from the data storage device 106 to the main memory 108 for execution by the processor 101.

Figure 2:
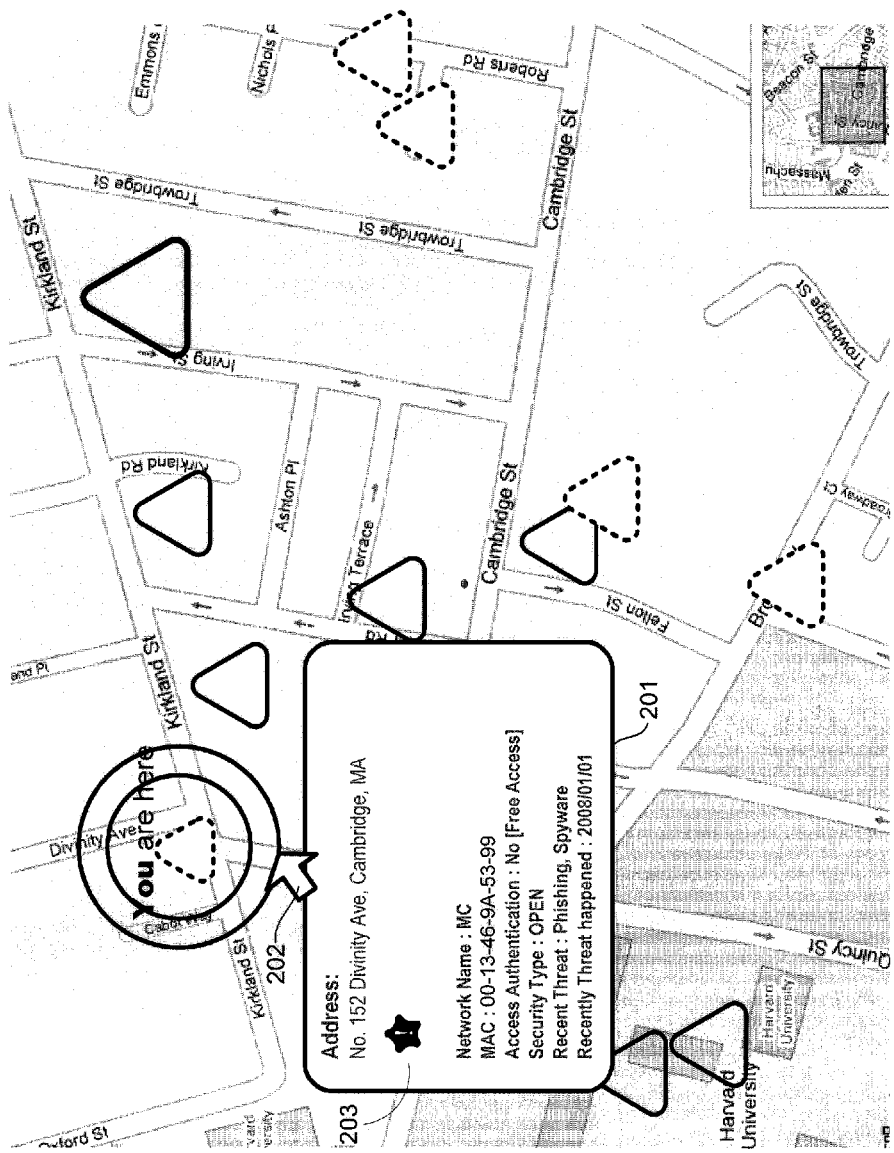
FIGS. 2 and 3 show screen images in accordance with an embodiment of the present invention.
Figure 3:
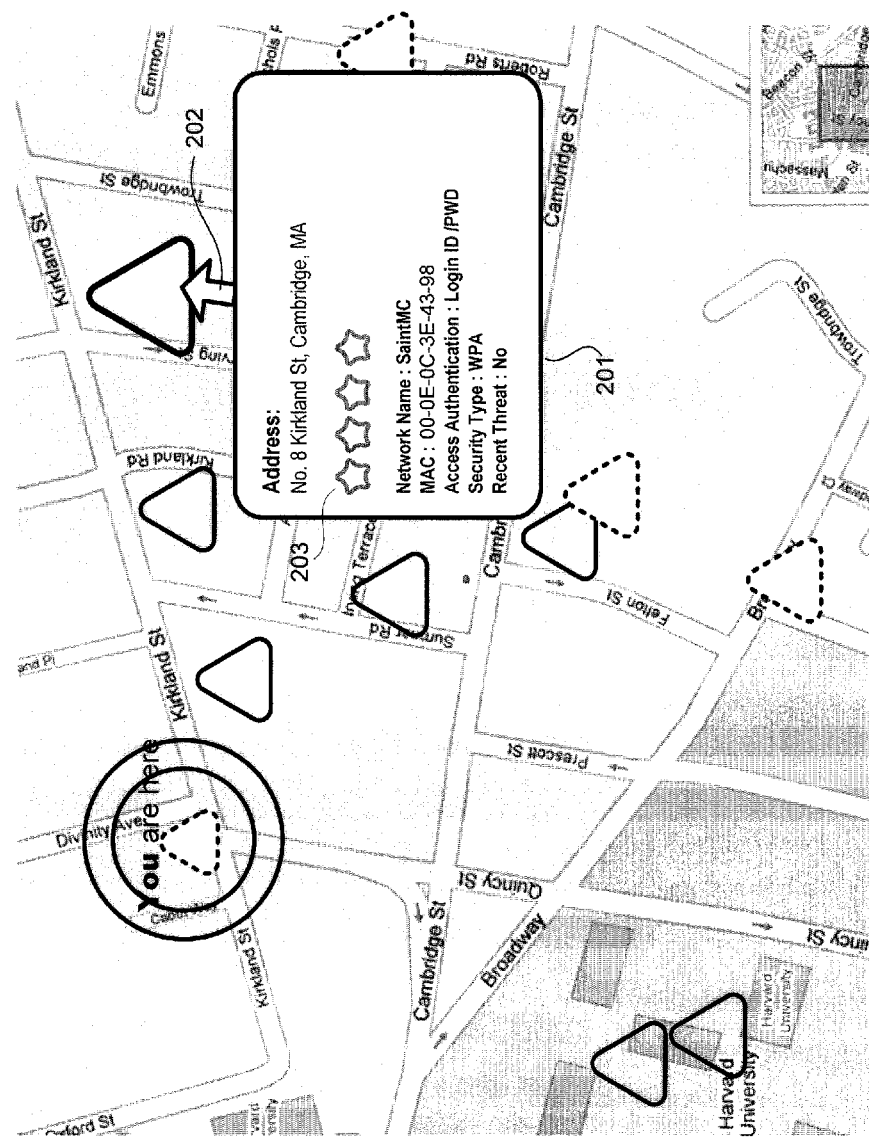

FIGS. 2 and 3 show screen images in accordance with an embodiment of the present invention. The screen images of FIGS. 2 and 3 may be displayed on a display monitor of a client computer, such as a power client computer 430 or a client computer 440 shown in FIG. 4. The screen images of FIGS. 2 and 3 may be rendered by a web browser, for example. In the example of FIG. 2, the screen image includes a geographical map in the general vicinity where the client computer is physically located. Such a geographical map may be obtained using a global positioning system (GPS), for example. The screen image shows where the client computer is currently located (see "You are here") and a message box 201 indicating access point information, such as the access point's geographic location (e.g., its street address), network information, and security information. In the example of FIG. 2, the network information includes the access point's network name, MAC (media access control) address, and authentication requirement. The security information includes the security type indicating the network security protocol used, recent threat, and the date the recent thread last occurred. The recent threat indicates the computer security threat posed by the access point. In the example of FIG. 2, the recent threats for the access point with the network name "MC" and a MAC address of 00-13-46-9A-53-99 are "Phishing" and "Spyware." That is, the access point was detected to be performing, perpetuating, or distributing malicious codes for phishing and spyware most recently on Jan. 1, 2008 (see "Recent Threat happened"). The message 201 may include a graphical icon 203 representing a score of severity of the computer security threat or lack of threat. In the example of FIG. 2, the graphical icon 203 is a darkened star with an exclamation point to warn the user of the potential issue with the access point currently selected by the cursor 202. The graphical icon 203 may have other shapes or designs depending on the application.

Table 1 shows examples of access point information that may be displayed in a client computer.

TABLE 1

| Information | Example |
| --- | --- |
| Network Name | Access point, base station or ISP name |
| Security type | Open/WEP/WPA-PSK/IEEE 802.1x |
| Access method | Free Access/ID PSD |
| Signal strength | Strong/Medium/Weak |
| Threat | DHCP/DNS Pharming, Virus, Spyware, Phishing, None |

The screen image of FIG. 2 also shows other access points that may be in the current geographic location of the client computer. The access points may be accessible to the client computer in its current location or are within a short distance, for example. In the example of FIG. 2, the access points are indicated as triangles to graphically illustrate the security information of the access point, with a dashed triangle indicating an access point that poses a computer security threat and a solid triangle indicating an access point that has not been detected as posing a computer security threat.

The security information included in the message 201 and graphically illustrated in the screen image may be obtained by connecting to the access points for evaluation and scanning. For example, a computer with appropriate antivirus program may connect to an access point to perform a security evaluation of the access point, such as to monitor the behavior of the access point and analyze packets to and from the access point to determine if the access point poses a computer security threat. The computer may also include or access a listing of MAC addresses of access points known to pose computer security threats. The computer performing the security evaluation of the access point may forward the result of the evaluation to a security server computer that maintains an access point database. When a client computer is in a particular geographic location, the client computer may query the security server for access point information of access points in that location. The security server may provide the result of the query to the client computer, which then displays the result of the query over a geographical map of the client computer's current location. The displaying of the access point information over a geographic map advantageously allows the user of the client computer to readily select safe wireless access points in his general area.

FIG. 3 shows the screen image of FIG. 2 when the user points the cursor 202 to a different wireless access point. In the example of FIG. 3, the cursor 202 points to an access point that poses no detected security threat. In this case, the number of clear stars of the graphical icon 203 indicates the security score of the access point. One to four clear stars indicate that the access point is relatively safe, with four stars indicating the highest level of safety. For example, four clear stars may indicate that the access point has been evaluated for safety in the last week, while a single clear star may indicate that the access point has been evaluated more than a month ago. Absence of a graphical security score may indicate that the access point has not been evaluated. In the example of FIG. 3, the four clear stars indicate that the access point having a network name of "SaintMC" and a MAC address of 00-0E-0C-3E-43-98 is relatively safe to access at this time. The security information may change at a later time depending on the behavior of the access point in the future. With the information shown in FIGS. 2 and 3, a user of a client computer can make an informed decision as to which available access point to select to access the Internet, for example.

Figure 4:
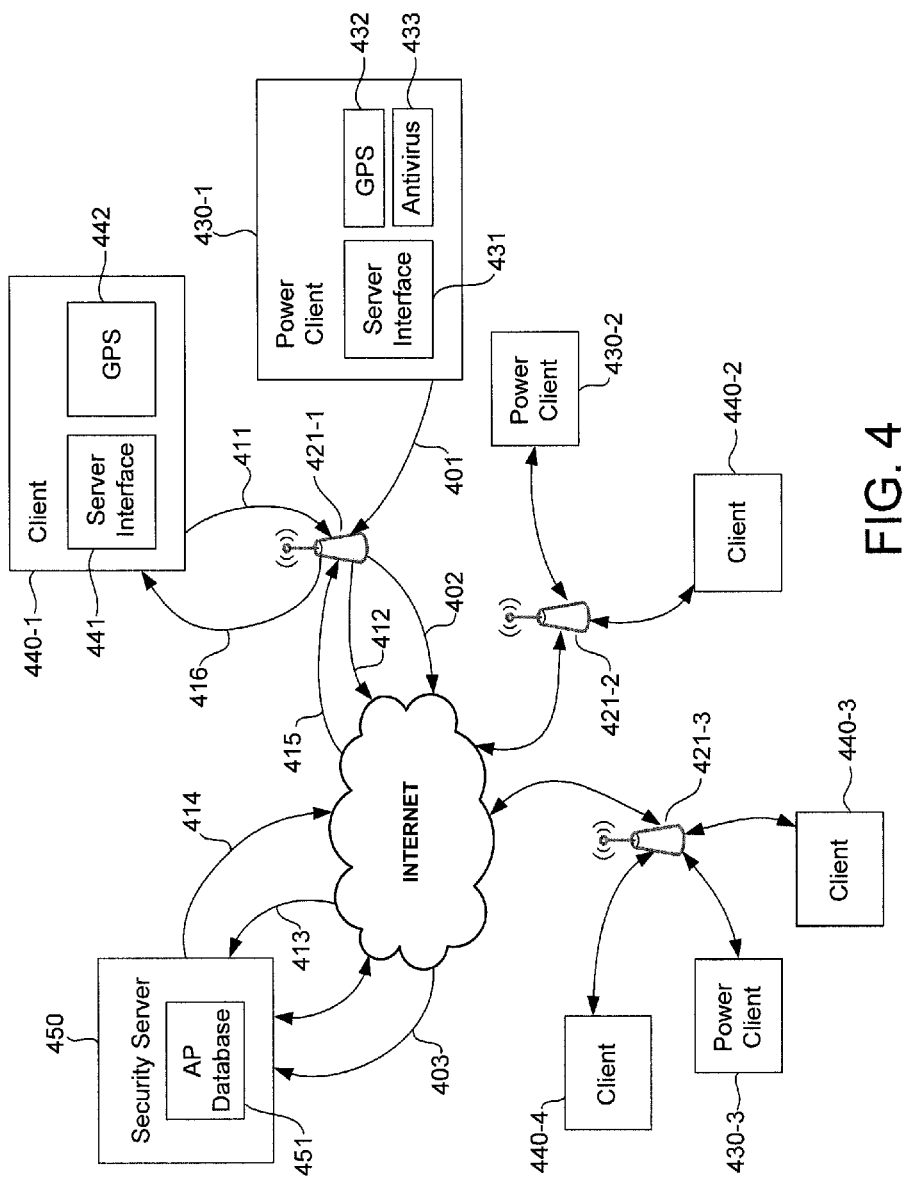
FIG. 4 schematically shows a computing environment illustrating selection of a computer network wireless access point in accordance with an embodiment of the present invention.

FIG. 4 schematically shows a computing environment illustrating selection of a computer network wireless access point in accordance with an embodiment of the present invention. In the example of FIG. 4, the computing environment includes a security server computer 450, power client computers 430 (i.e., 430-1, 430-2, . . . ), client computers 440 (i.e., 440-1, 440-2, . . . ), and access points 421 (i.e., 421-1, 421-2, . . . ). An access point 421 is an apparatus that allows client computers 430 and 440 to wirelessly connect to a computer network, which in the example of FIG. 4 includes the Internet.

A power client computer 430 may comprise a computationally capable mobile device, such as laptop and notebook computers, equipped with computer security threat detection. Generally speaking, a power client computer 430 has enough computing resources to be able to perform a security evaluation of an access point 421 and provide the result of the evaluation to the security server computer 450. In the example of FIG. 4, a power client computer 430 may include a security server interface 431, an antivirus 433, and a GPS 432. The aforementioned components are shown as being in the power client computer 430-1 for illustration purposes. The other power client computers 430 may be similarly configured.

The server interface 431 may comprise computer-readable program code for communicating with the security server computer 450. In one embodiment, the server interface 431 is configured to forward to the security server computer 450 the current geographic location of the power client computer 430 and the result of a security evaluation performed by the antivirus 433. The server interface 431 may be configured to receive from the security server computer 450 access point information, including network information and security information of access points 421 in the general geographic location of the power client computer 430. The access point information may indicate whether any of the access points 421 in the geographic location of the power client computer 430 poses a computer security threat.

The antivirus 433 may comprise computer-readable program code for performing a security evaluation of an access point 421. In one embodiment, the antivirus 433 is configured to detect phishing, spyware, Trojans, man-in-the-middle, viruses, and other malicious code operations. For example, the antivirus 433 may be configured to detect for virus infection in the current domain of the access point 421, and deem the access point 421 to pose a computer security threat if any host in its domain is infected. As another example, the antivirus 433 may be configured to perform anti-pharming and hotspot checking. Other techniques for performing a security evaluation of an access point may also be used without detracting from the merits of the present invention.

The GPS 432 may comprise computer-readable program code and associated hardware for detecting the current geographic location of the power client computer 430. The server interface 431 may be configured to receive from the GPS 432 the current geographic location of the power client computer 430 and provide that geographic location to the security server computer 450. The GPS 432 may also be configured to provide a geographic map of the current geographic location of the power client computer 430. The server interface 431 may be configured to overlay on the geographic map access point information received from the security server computer 450. Example overlaying of access point information on a geographic map is shown in previously discussed FIGS. 2 and 3.

A client computer 440 may comprise a mobile device with limited computing resources, such as personal digital assistant (PDA), mobile phone, portable video and music player, and the like. Generally speaking, a client 440 does not have any means of performing a security evaluation of an access point 421. In the example of FIG. 4, a client computer 440 includes a server interface 441 and a GPS 442. The aforementioned components are shown as being in the client computer 440-1 for illustration purposes. The other client computers 440 may be similarly configured.

The server interface 441 may comprise computer-readable program code for communicating with the security server computer 450. In one embodiment, the server interface 441 is configured to forward to the security server computer 450 the current geographic location of the client computer 440. The server interface 441 may be configured to receive from the security server computer 450 access point information, including network information and security information of access points 421 in the general geographic location of the client computer 440. The access point information may indicate whether any of the access points 421 in the geographic location of the client computer 440 poses a computer security threat.

The GPS 442 may comprise computer-readable program code and associated hardware for detecting the current geographic location of the client computer 440. The server interface 441 may be configured to receive from the GPS 442 the current geographic location of the client computer 440 and provide that geographic location to the security server computer 450. The GPS 442 may also be configured to provide a geographic map of the current geographic location of the client computer 440. The server interface 441 may be configured to overlay on the geographic map access point information received from the security server computer 450.

In some embodiments, a power client computer 430, a client computer 440, or both do not include a GPS, such as the GPS 432 or 442. In that case, the user manually provides (e.g., by keyboard or pen entry) the current geographic location of his client computer (e.g., a power client computer 430 or a client computer 440) to the server interface (e.g., server interface 431 or 441), which then forwards the geographic location to the security server computer 450. The security server computer 450 may provide not only access point information, but also a geographic map of the current geographic location of the client computer. The geographic map provided by the security server computer 450 to the client computer may include overlaid access point information similar to those shown in FIGS. 2 and 3.

The security server computer 450 may comprise a server computer configured to receive access point security evaluations and to provide access point information. In one embodiment, the security server computer 450 is configured to receive security evaluations from power client computers 440 and access point information from other sources. In the example of FIG. 4, the security server computer 450 includes an access point database 451. The access point database 451 may comprise a listing of access points 421 in particular geographic locations and associated access point information. The access point information may comprise network information and security information for particular access points 421. For example, the security server computer 450 may build the access point database 451 with access point information from security evaluations received from power client computers 430. The security server computer 450 may receive requests for access point information in the form of a query from power client computers 430 and client computers 440, retrieve access point information from the access point database 451, and provide the access point information to requesting power client computers 430 and client computers 440.

An example operation of the computing environment of FIG. 4 is now discussed using the power client computer 430-1, the client computer 440-1, and the access point 421-1 as examples. Other power client computers 430, client computers 440, and access points 421 may operate in a similar fashion.

The power client computer 430-1 may use the antivirus 433 to perform a security evaluation of the access point 421-1. The power client computer 430-1 may send the result of the security evaluation in the form of a threats report to the security server computer 450. The threats report may be forwarded from the power client computer 430-1 to the security server computer 450 by way of the access point 421-1 over the Internet (arrows 401, 402, and 403). An example threats report for forwarding the security evaluation from the power client computer 430-1 to the security server computer 450 is shown in Table 2.

TABLE 2

Threats Report Sample

Location:
GPS Position: 25"01'57.78 North    121"33'59.15 East
Address: No. 150, Sec. 5, Sinyi Rd., Sinyi District, Taipei City 110, Taiwan (R.O.C.)
Threat: Pharming, on Oct. 12, 2007 13:00:00
Network Description: 802.11, WPA, MAC: 00:15:46:7B:53:83

In the example of Table 2, the location of the access point may be the "GPS position" of the access point 421-1 where the power client 430-1 is geographically located. The location may also include a street address of the access point. The threat is pharming detected on Oct. 12, 2007. The network description includes the wireless standard, authentication (Open in the example of Table 2), and MAC address of the access point 421-1. The security server computer 450 may use information from the threats report to build and maintain the access point database 451.

The client computer 440-1 may send a query to the security server computer 450 to request for access point information. The query may be sent from the client computer 440-1 to the security server computer 450 by way of the access point 421-1 and over the Internet (arrows 411, 412, and 413). The query may include the current geographic location of the client computer 440-1 as shown in the example of Table 3.

TABLE 3

Query Sample

Location: 25"01'57.78 North   121"33'59.15 East
Address: No. 150, Sec. 5, Sinyi Rd., Sinyi District, Taipei
City 110, Taiwan (R.O.C.)

The security server computer 450 may respond to the request for access point information by using the location information from the query to check the access point database 451 for access point information of access points in the general area of the client computer 440-1. In response to the query, the security server computer 450 may send a query result to the client computer 440-1 (arrows 414, 415, and 416). The query result may include access point information for access points in the general location of the client computer 440-1. The access point information may be for those access points 421 that may be accessible to the client computer 440-1. An example query result for is shown in Table 4.

TABLE 4

Query Result Sample

Location:
GPS position : 25"01'57.78 North   121"33'59.15 East
Address: No. 150, Sec. 5, Sinyi Rd., Sinyi District, Taipei City 110,
Taiwan (R.O.C.)
Threat: Pharming
Network Description: 802.11, WPA, MAC: 00:15:46:7B:53:83
Network Name: WiFly
Security Type: WPA
Encryption: AES
Recently thread: Oct. 12, 2007 13:00:00

The query result of Table 4 may include additional access point information for other access points in the area.

As can be appreciated, the power client computer 430-1 may also send a query for access point information to the security server computer 450 and receive from the security server computer 450 a responsive query result.

The user of a power client computer 430 or client computer 440 can select a wireless access point in his general area based on access point information received from the security server computer 450.

Preferably, communication between the security server computer 450 and client computers 430 and 440 is encrypted or has a security feature for preventing eavesdropping, tampering, or spoofing. This advantageously allows threat reports, queries, and query reports to be communicated even over malicious or compromised access points 421.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of selecting a computer network wireless access point, the method comprising:
    performing by a first client computer a first security evaluation of a first wireless access point in a first geographic location;
    forwarding from the first client computer to a server computer the first geographic location of the first client computer and a first result of the first security evaluation of the first wireless access point performed by the first client computer;
    performing by a second client computer a second security evaluation of a second wireless access point in a second geographic location;
    forwarding from the second client computer to the server computer the second geographic location of the second client computer and a second result of the second security evaluation of the second wireless access point performed by the second client computer;
    the first client computer at the second geographic location receiving from the server computer access point information for a plurality of computer network wireless access points in the second geographic location; and
    displaying at least a portion of the access point information in the first client computer to inform a user of the first client computer whether any of the plurality of computer network wireless access points poses a computer security threat, the portion of the access point information including information from the second result of the second security evaluation performed on the second wireless access point by the second client computer and security information comprising a security type indicating a network security protocol used, recent threat, and a date the recent threat last occurred.

2. The method of claim 1 wherein the access point information is displayed overlaying a geographic map that includes the second geographic location.

3. The method of claim 1 wherein the computer security threat includes phishing.

4. The method of claim 1 wherein the access point information includes MAC addresses of the plurality of computer network wireless access points.

5. The method of claim 1 wherein the server computer includes a database of access point information created from security evaluations performed by first client computer, the second client computer, and other client computers in different geographic locations.

6. The method of claim 1 further comprising:
    forwarding from a third client computer to the server computer a result of a security evaluation of at least one of the plurality of computer network wireless access points, the result of the security evaluation indicating whether the at least one of the plurality of computer network wireless access points poses a computer security threat.

7. The method of claim 6 wherein the third client computer includes an antivirus program for performing the security evaluation of the at least one of the plurality of computer network wireless access points.

8. A system comprising:
    a first client computer that performs a first security evaluation of a first wireless access point in a first geographic location, forwards to a server computer the first geographic location of the first client computer and the first result of the first security evaluation of the first wireless access point performed by the first client computer;
    a second client computer that performs a second security evaluation of a second wireless access point in a second geographic location, forwards to the server computer the second geographic location of the second client computer and a second result of the second security evaluation of the second wireless access point performed by the second client computer; and
    the server computer that receives results of security evaluations from the first client computer, the second client computer, and other client computers that perform security evaluations of wireless access points in different geographic locations, wherein the first client computer when in the second geographic location receives from the server computer access point information of a plurality of computer network wireless access points in the second geographic location and displays over a map that includes the second geographic location information from the second result of the second security evaluation performed on the second wireless access point by the second client computer and security information comprising a security type indicating a network security protocol used, recent threat, and a date the recent threat last occurred.

9. The system of claim 8, wherein the server computer includes a database of access point information created from security evaluations performed by the first client computer, the second client computer, and other client computers in different geographic locations.

10. The system of claim 9, further comprising:
a third client computer that forwards to the server computer a result of a security evaluation of at least one of the plurality of computer network wireless access points, the result of the security evaluation indicating whether the at least one of the plurality of computer network wireless access points poses a computer security threat.

11. The method of claim 10, wherein the third client computer includes an antivirus program for performing the security evaluation of the at least one of the plurality of computer network wireless access points.

\* \* \* \* \*